Figure 1:
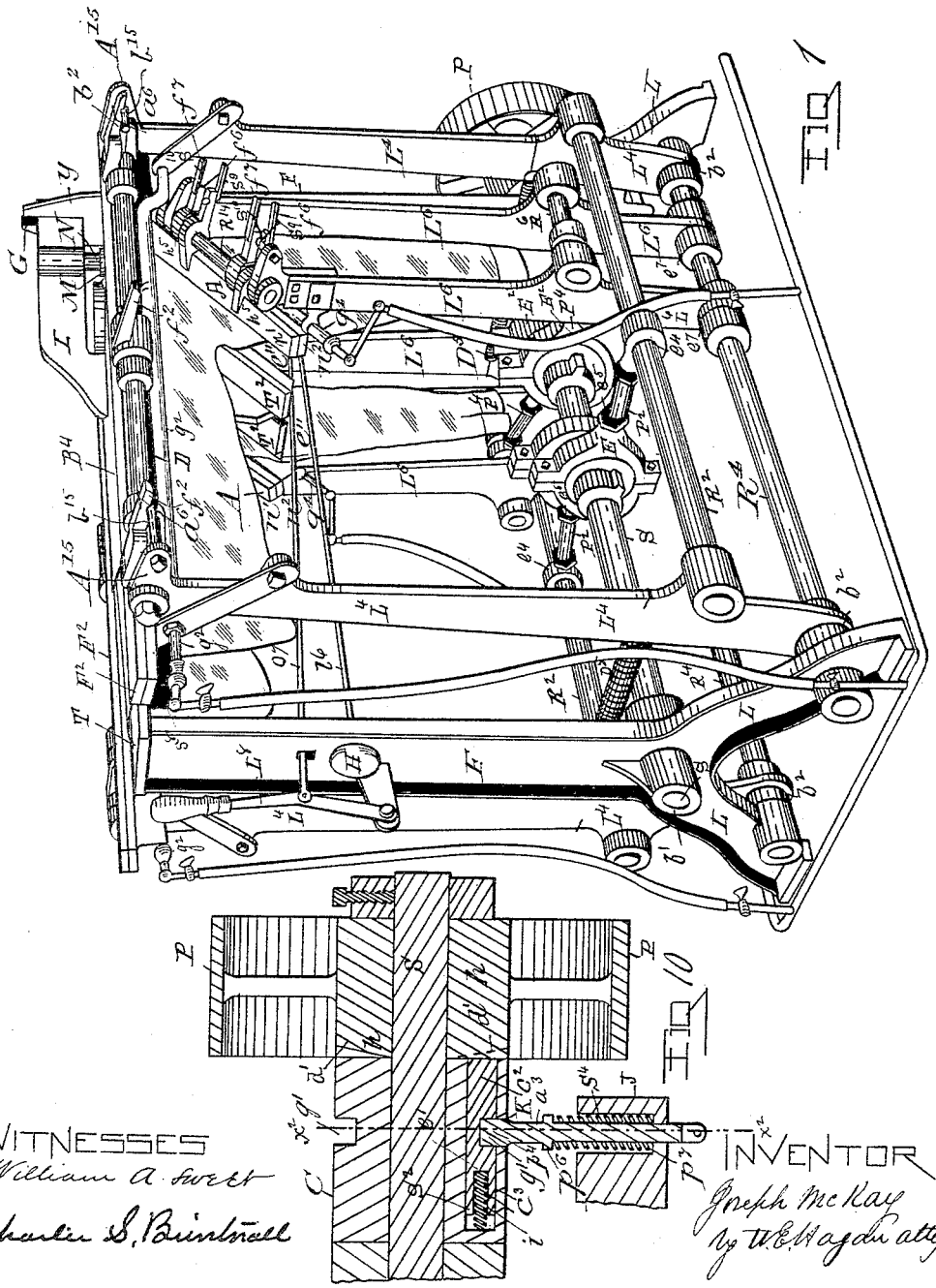

(No Model.) 9 Sheets—Sheet 3.
J. McKAY.
MACHINE FOR CREASING THE FOLD LINES INTO SHIRTS.

No. 437,786. Patented Oct. 7, 1890.

(No Model.) 9 Sheets—Sheet 4.
J. McKAY.
MACHINE FOR CREASING THE FOLD LINES INTO SHIRTS.
No. 437,786. Patented Oct. 7, 1890.

(No Model.) 9 Sheets—Sheet 7.

J. McKAY.
MACHINE FOR CREASING THE FOLD LINES INTO SHIRTS.

No. 437,786. Patented Oct. 7, 1890.

WITNESSES
William A. Sweet
Charles S. Bunnell

INVENTOR
Joseph McKay
by W E Hagan
atty (No Model.) 9 Sheets—Sheet 8.
J. McKAY.
MACHINE FOR CREASING THE FOLD LINES INTO SHIRTS.
No. 437,786. Patented Oct. 7, 1890.
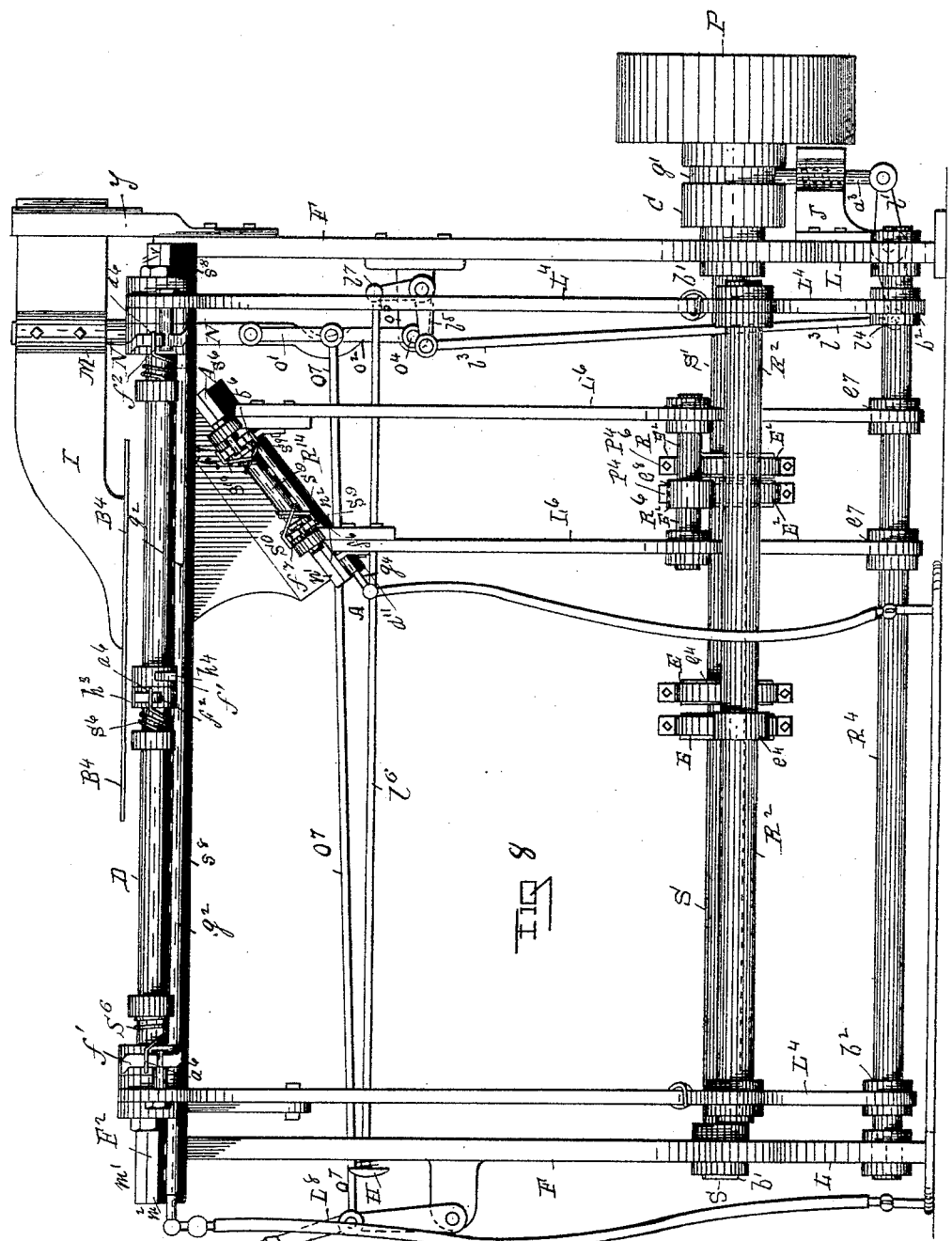
WITNESSES
William A. Swert
Charles S. Bruntnall
INVENTOR
Joseph McKay
by W. E. Hagan atty (No Model.) 9 Sheets—Sheet 9.

J. McKAY.
MACHINE FOR CREASING THE FOLD LINES INTO SHIRTS.

No. 437,786. Patented Oct. 7, 1890.

WITNESSES
William A. Sweet
Charles D. Buintnall

INVENTOR
Joseph McKay
by W. E. Hagan atty

THE NORRIS PETERS CO., PHOTO-LITHO., WASHINGTON, D. C.

UNITED STATES PATENT OFFICE.

JOSEPH McKAY, OF TROY, NEW YORK.

MACHINE FOR CREASING THE FOLD-LINES INTO SHIRTS.

SPECIFICATION forming part of Letters Patent No. 437,786, dated October 7, 1890.

Application filed January 17, 1890. Serial No. 337,174. (No model.)

*To all whom it may concern:*

Be it known that I, JOSEPH McKAY, of the city of Troy, county of Rensselaer, and State of New York, have invented a new and useful Improvement in Machines for Creasing Fold-Lines into Shirts, of which the following is a specification.

My invention relates to a mechanism for putting into laundered shirts the bosom side-fold lines and also into the sleeves the angular fold-lines on which the shirt body and sleeves are infolded to be packaged and put in boxes; and the object and purpose of my invention are to put the fold-lines in with regularity, so that the shirts when folded and packaged will have a uniform appearance; and another purpose of my invention is to cheapen the cost of putting laundered shirts into a uniform shape for packing by doing more rapidly and cheaply by machinery what has heretofore been done by hand.

My invention consists, as will be more fully detailed hereinafter in connection with its illustration, in the combination, with a table on which the shirt-body is laid with its bosom uppermost and sleeves pendent from the table sides, said table having a holder-plate that is operated to descend onto the bosom and hold it there while the fold-lines are made therein and then to ascend from off the bosom, of a fold-line-creasing mechanism arranged at each side of the table, each of which is operated at the same time to press upon one of the side edges of the table or plate and that part of the shirt thereat between the side edges of the table-plate and said fold-line creasers, and after thus creasing them to recede therefrom, and a stationary fold-line plate that is downwardly and frontwardly projected from beneath the table-plate on an angle, and a fold-line creaser at each side of said angularly-placed plate, each of which fold-line creasers is operated to press upon the adjacent side edge of the angularly-placed fold-line plate, so as to crease into the shirt-sleeve thereat the fold-line on which the sleeves are inturned and then recede therefrom.

My invention also relates to the subcombination of the parts which I illustrate and describe, where such parts perform specific function, as will be detailed in the claims.

Accompanying this specification to form a part of it there are nine plates of drawings containing seventeen figures illustrating my invention, with the same designation of parts by letter reference used in all of them.

Figure 2:
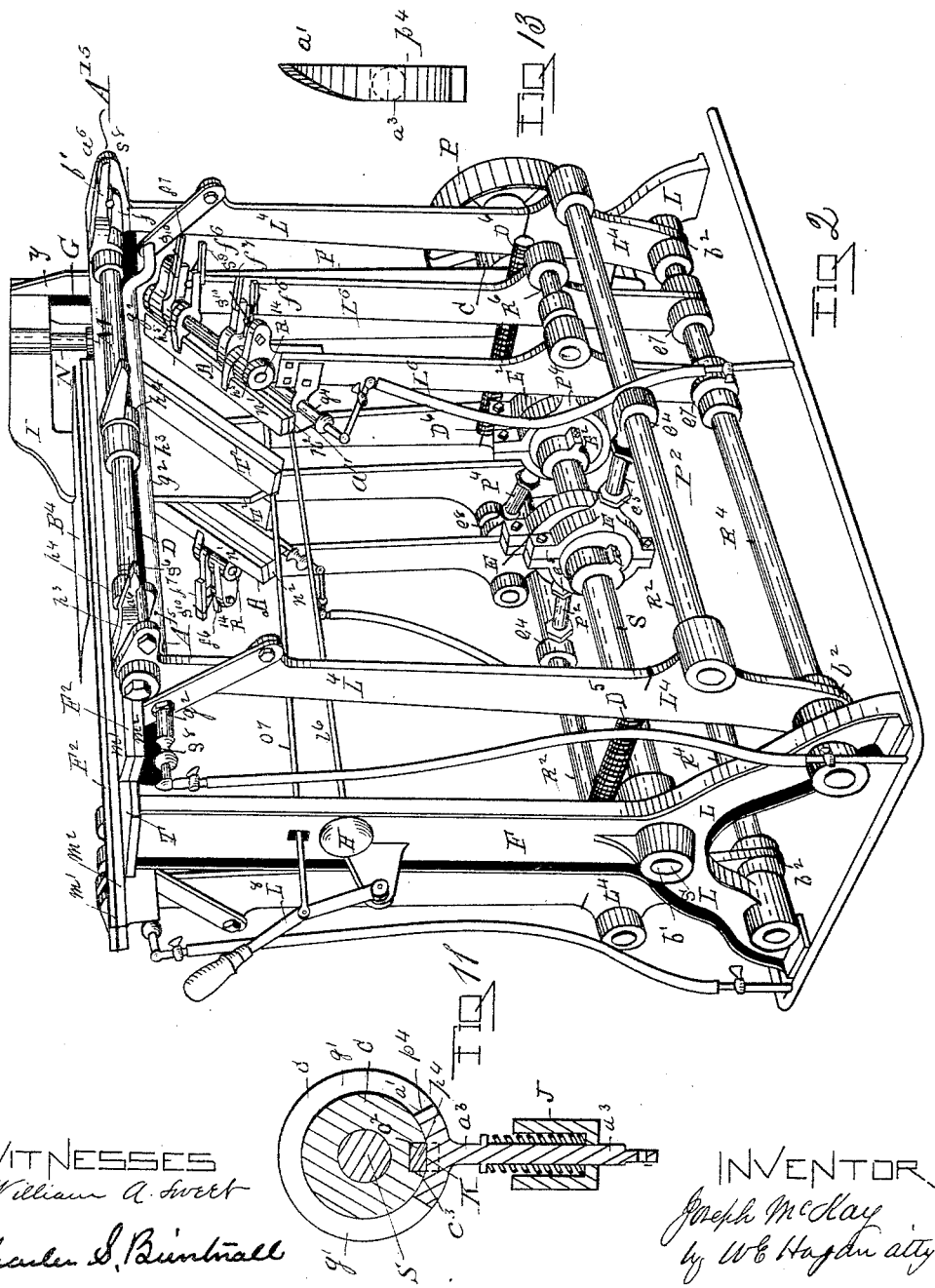
Figure 3:
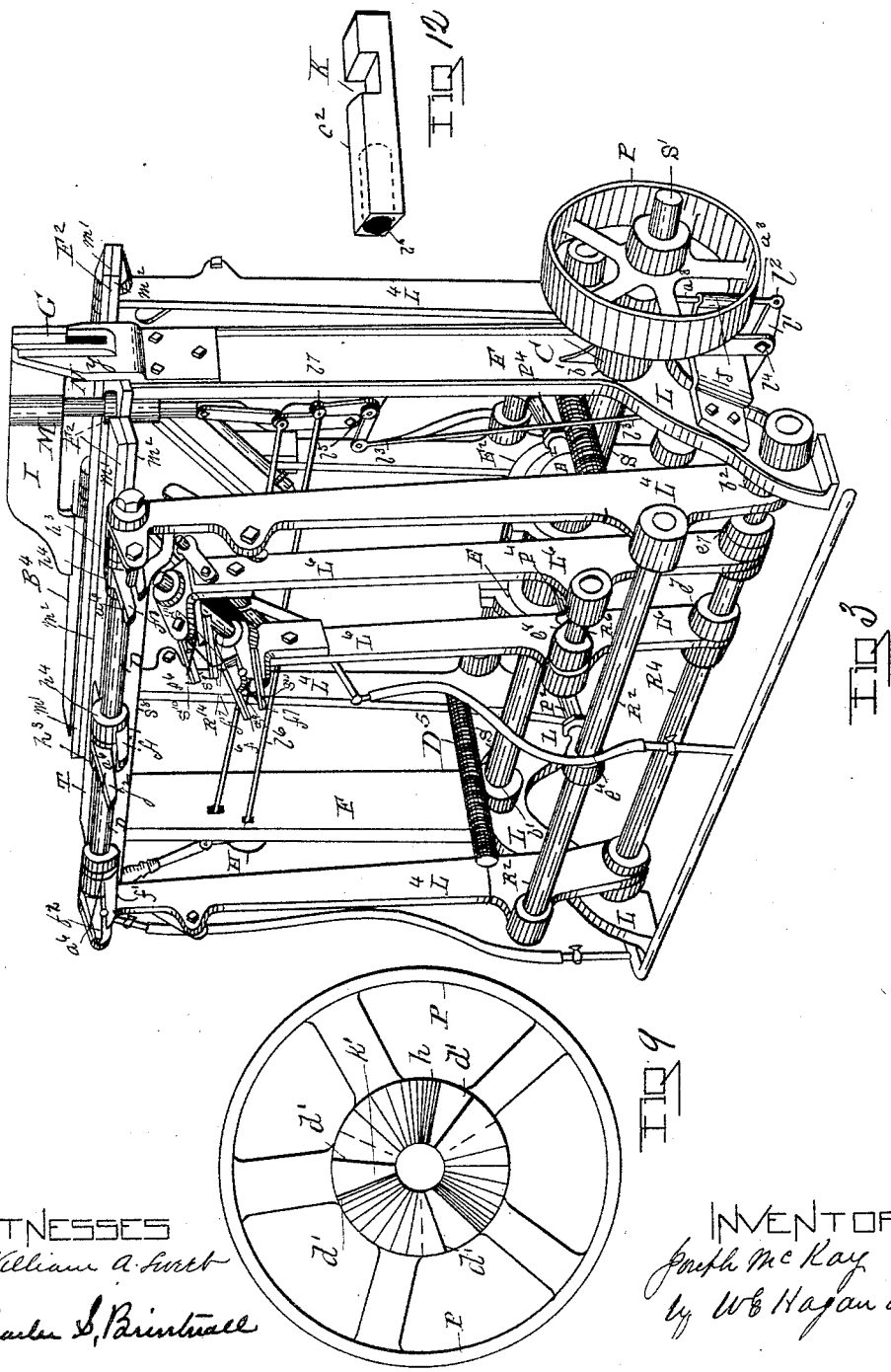
Figure 4:
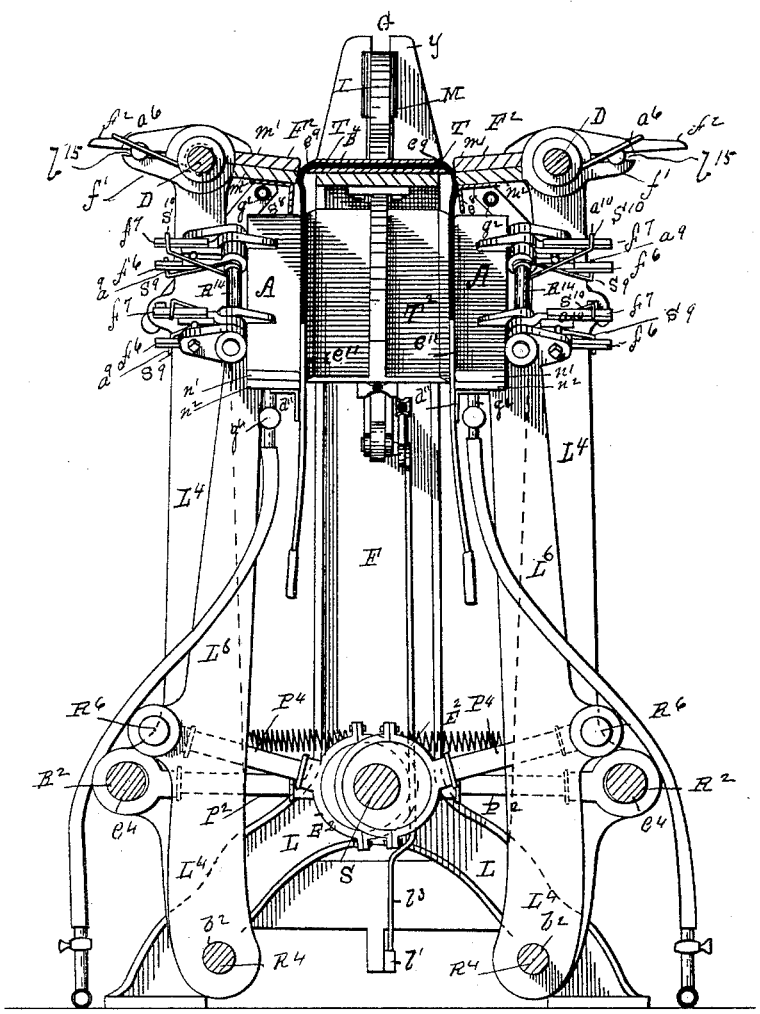
Figure 5:
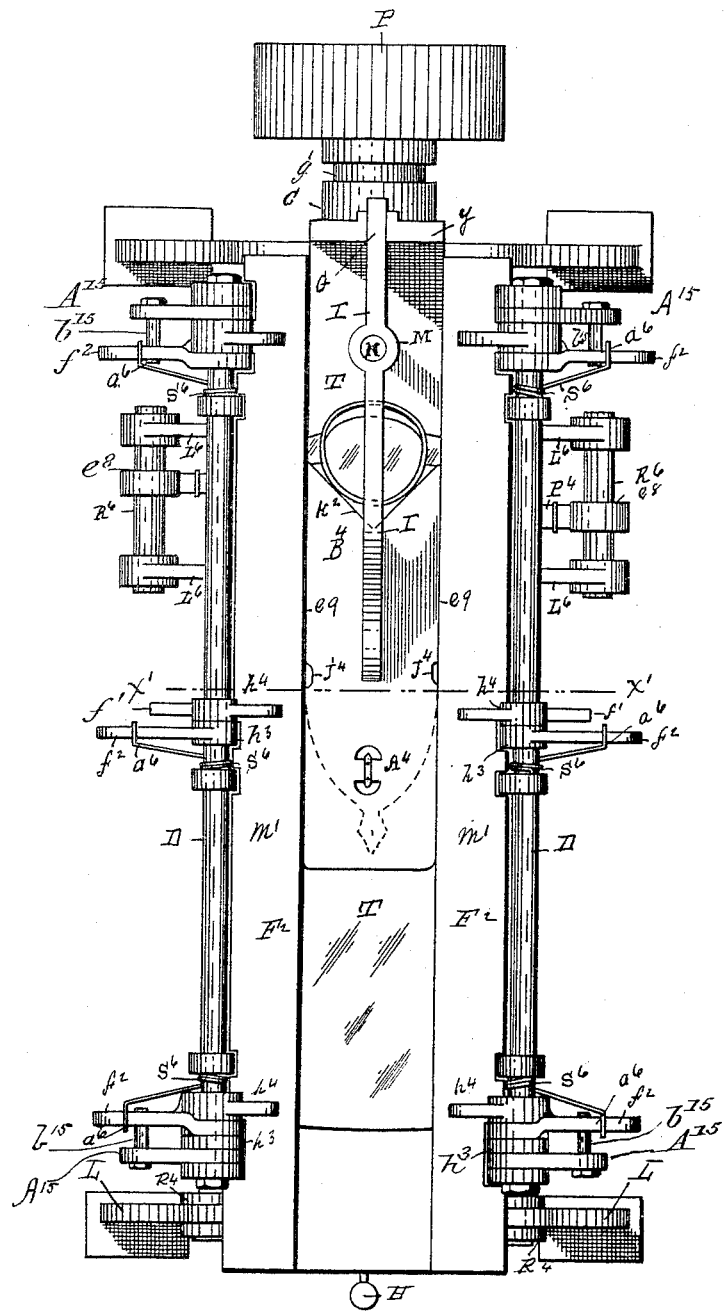
Figure 6:
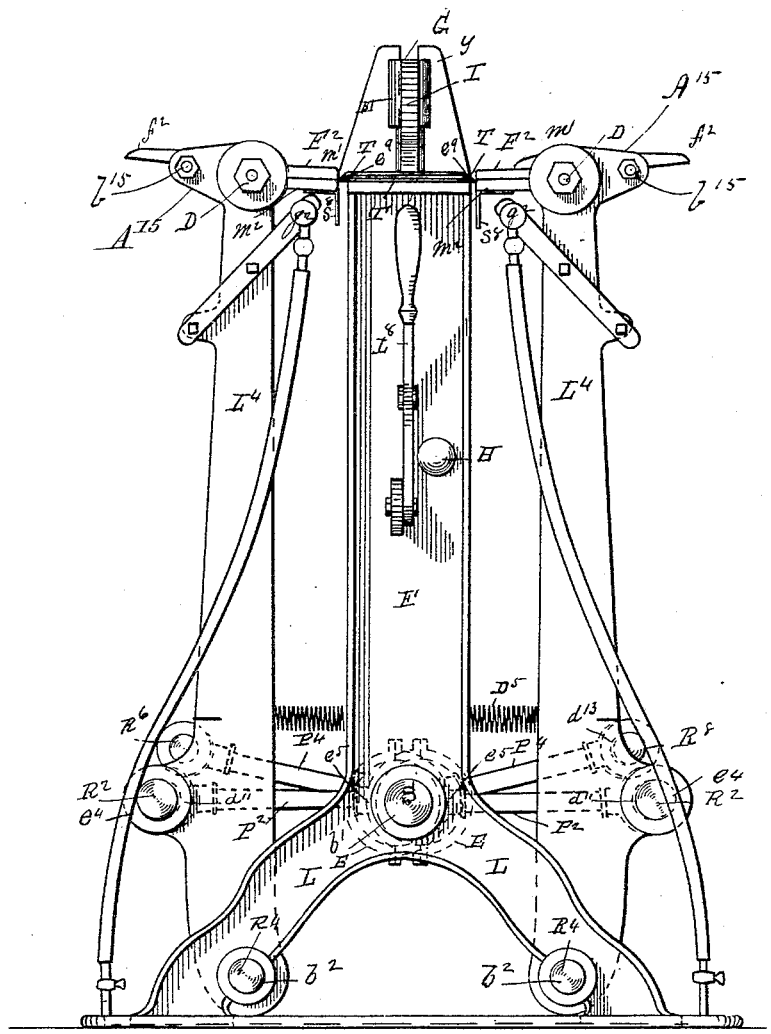
Figure 7:
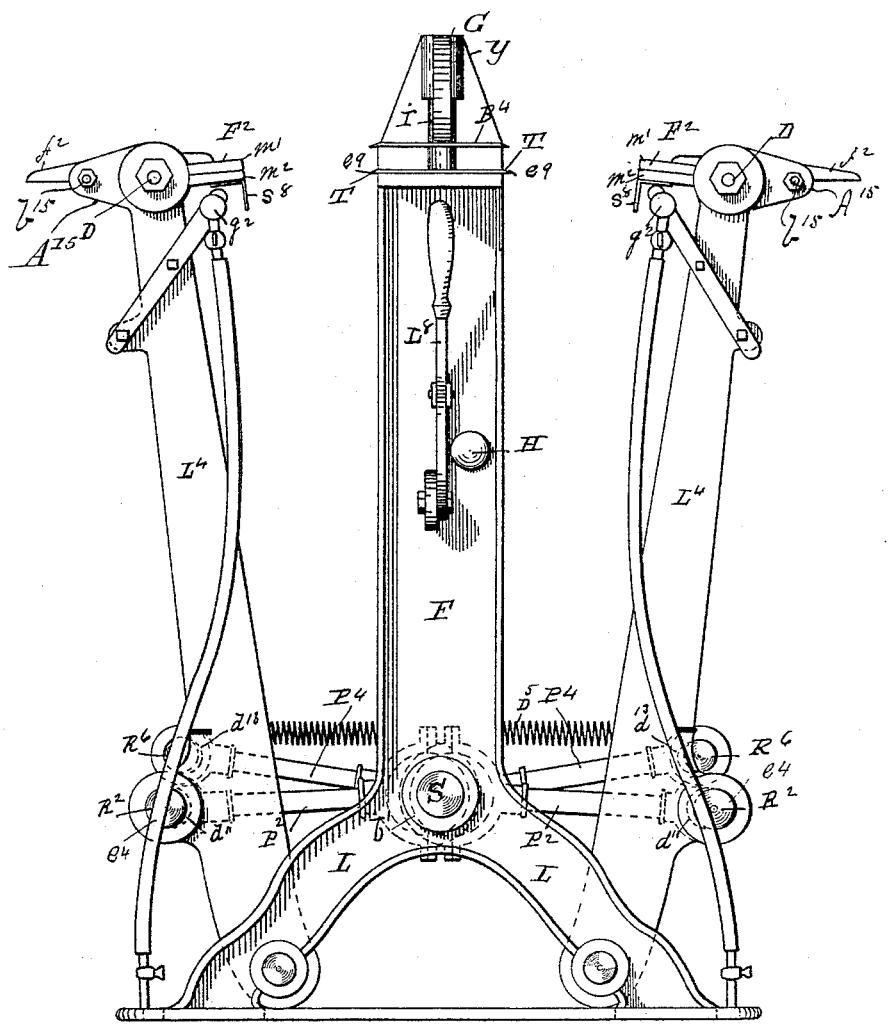
Figure 14:
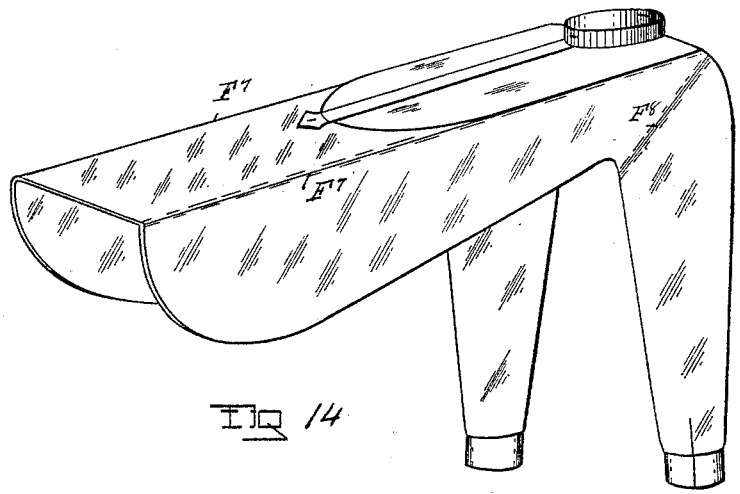
Figure 15:
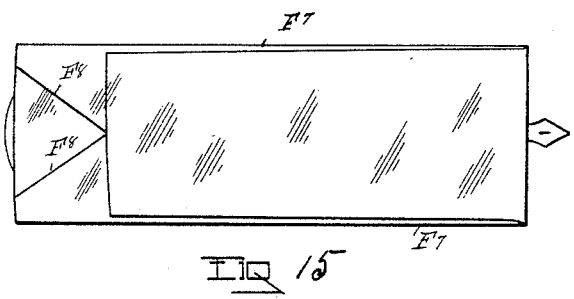
Figure 16:
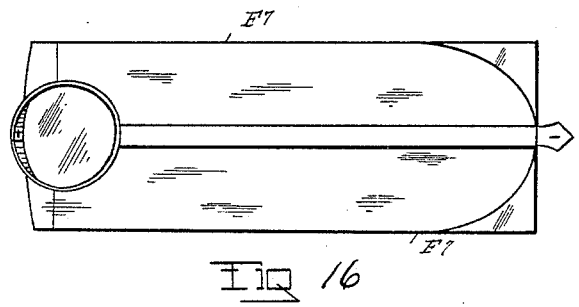
Figure 17:

Of the illustrations, Figure 1 is a perspective of my shirt-fold-line-producing mechanism, illustrated with the front end and one side thereof facing the view and with a shirt as placed upon the machine, the bosom-holder plate as down upon the shirt, but with the side-creasers and angular-fold-line creasers away from engagement with the edges of the fold-lines plates. Fig. 2 is also a perspective of the parts shown at Fig. 1, taken with the front end and one side as facing the view, but with the bosom-holder plate shown as raised and the machine in position to have a shirt placed therein. Fig. 3 is a perspective of the machine with the rear end and one side facing the view and with the bosom-holder plate shown as raised from off the table-plate for the placing of a shirt thereon. Fig. 4 is a section taken on the line $x'\ x'$ of Fig. 5. Fig. 5 is a top view of the machine shown with the side-fold creasers and angular-fold creasers closed in against the edge of the table-plates. Fig. 6 is a front end view of the machine with the side-fold creasers shown as closed in against the table-plates. Fig. 7 is a front end elevation of the machine with the side-fold creasers shown as moved out preparatory to the insertion of the shirt. Fig. 8 is a side elevation of the machine. Fig. 9 is a side elevation of the driving-pulley, taken with what is its inner side facing the view. Fig. 10 is a section taken vertically and centrally through the driving-pulley, its shaft, clutch-wheel, and a spring-latch clutch, and a tripping-bar by which the mechanism is stopped after having made one revolution. Fig. 11 is a cross-section taken on the line $x^2$ $x^2$ of Fig. 10. Fig. 12 is a perspective of the clutch spring-latch shown as removed from its connection, and Fig. 13 is a perspective of the tripping-bar shown as removed from its connection. Fig. 14 shows a shirt after the bosom-side-fold creases and the sleeve angular-fold-line creases have been made therein by the machine. Fig. 15 shows the positions of the bosom-side-fold creases and the angular sleeve-fold creases after the shirt has been infolded by subsequent operations. Fig. 16 shows the bosom side of the shirt after being so folded, and Fig. 17 shows a modified form of fold-creasing device.

The parts of the mechanism thus illustrated are designated by letter reference, and the function of the parts is described as follows:

The letter F designates the frame of the machine, and L its legs or feet.

The letter S designates the main driving-shaft, having its end bearings at $b'$ in the end frame parts F. The letter P designates the driving-pulley adapted to run loosely on the said shaft S, and the letters $d'$ $d'$ $d'$ designate clutch-stops made on the inner face $k'$ of the driving-pulley hub, (indicated at $h$ and shown at Fig. 9.)

The letter C designates a clutch-wheel that is connected to, so as to turn with, the shaft S, and the letter $c^2$ designates a spring clutch-latch made with the recess K, and which latch is arranged to move in a chamber $c^3$, made in said clutch-wheel C, parallel to the axis of the latter, as shown at Figs. 10, 11, and 12. The letter $r$ designates a chamber made in the end of said clutch-latch, and $S^2$ a spring arranged in said chamber, so as to bear on the inner end of the clutch-latch $e'$ and upon the inner end face of the chamber $c^3$, so that said clutch-latch is moved outwardly in said chamber $c^3$ by said spring, and when so moved it will engage with that one of the clutch-stops $d'$ with which it comes in contact on the rotating pulley P, (shown at Fig. 10,) and when so engaged the clutch-wheel C and shaft S will be rotated.

The letter $g'$ designates a groove made to encircle the clutch-pulley C, and the letter $p^4$ a tripping-bar adapted to run therein, said tripping-bar being mounted on the upper end of a rod or leg $a^3$, with a T-form connection, as shown at Fig. 11. The arm $a'$ of this tripping-bar is made wedge form, as shown at Fig. 13, and it is arranged in the groove $g'$ so that its wedge-form end arm $a'$ will point toward and in a direction that will constantly meet the rotation of the clutch-wheel. When this tripping-bar is drawn from out of the groove $g'$, the spring-latch being released from the engagement which the arm $a'$ of the tripping-bar makes with its recess K, the spring-latch is moved outwardly to engage with one of the stops $d'$ on the inside face of the pulley P to start the clutch C and shaft S, as before described, and when the tripping-bar is allowed to return to the groove $g'$ it runs therein until its wedge-form arm $a'$ enters the recess K of the latch-clutch, and, revolving with the wheel C, it comes around to again engage with the tripping-bar, when the latter, entering the recess, crowds the latch-clutch back away from its engagement with the pulley P and the machine stops.

The letter $a^3$ designates the downwardly-projected arm of the tripping-bar $p^4$, and the letter J designates a bracket that is rearwardly extended from the frame F, as shown at Figs. 3, 8, 10, and 11. The letter $p^7$ designates a chamber formed in said bracket for the reception of a spring $S^4$ and the passage of the arm $a^3$. The letter $p^6$ designates a collar formed on said arm, and the spring $S^4$ encircles said arm between the bottom of the said chamber and said collar, so that said arm is pulled down to draw the tripping-bar from out of the groove $g'$ of the clutch-wheel C against the force of this spring $S^4$.

The letter $l'$ designates a lever, which is centrally pivoted to the frame F and at its outer end at $l^2$ to the arm $a^3$ of the tripping-bar $p^4$.

The letter $l^3$ designates a rod that at its lower end $l^4$ is pivoted to the lever $l'$ and at its upper end to the bell-crank lever $l^5$, and the letter $l^6$ designates a rod that at $l^7$ connects with the said bell-crank lever, and therefrom is extended frontwardly through the machine-frame and provided with a push-button H, by means of which the lever $l'$ is operated to pull down the tripping-bar to release the latch-clutch and start the mechanism, as before described.

The folders forming part of the creasing mechanism at each side of the machine are operated by the shaft S at each revolution of the latter, and they are constructed as follows: The letters $F^2$ designate the crease-folders for producing the bosom-side-fold creases in connection with the table-plate T, the construction of which latter will be described hereinafter. Each of these folders $F^2$ has two downwardly-extended legs $L^4$, that are journaled at $b^2$ $b^2$ onto the rod or bar $R^4$ at their lower ends, so as to oscillate thereon, said rod or bar connecting at its ends with the frame F. Each of these fold-creasers $F^2$ is constructed with a rod or bar $R^2$, which at its ends is secured to the legs $L^4$, and each is constructed with a pitman $P^2$, that at its outer end $e^4$ is journaled onto the rod or bar $R^2$ and at its inner end $e^5$ connected with the shaft S by means of an eccentric E, the latter on each of the two pitmen being arranged oppositely as to their eccentricity, so that when the shaft S makes one revolution the fold-creasers $F^2$ are drawn in toward each other to engage with the table-plate T, as will be more fully described hereinafter, and then move away from each other.

The upper part of the bosom-side-fold creasers $F^2$, and that which co-operates with the table-plate T to put in the bosom side-fold lines, as will be hereinafter described, is preferably made of two metal parts $m'$ $m^2$, each of which is pivoted onto the rod D, the lower part $m^2$ being so pivoted at $h^3$ and the upper part $m'$ at $h^4$. Each of the parts $m'$ and $m^2$ is constructed with outwardly-projected fingers, those arranged upon the part $m'$ being indicated at $f'$ and the fingers upon the part $m^2$ being indicated at $f^2$.

The letters $S^6$ designate springs that are attached at their ends to the hinging-rod D, and from where attached encircle said rod helically and terminate in a tangent arm $a^6$, that bears upon the upper side of the fingers $f^2$ of the folder part $m^2$, so that when these folder parts engage with the side edges of the table-plate T they yield a little for the latter to press in between them, the lower part $m^2$ yielding against the force of the spring $S^6$ and the plate $m'$ being raised on its hinged connection against its weight.

The letter $A^{15}$ designates a bracket projected outward from the upper ends of the legs $L^4$, as shown in Figs. 5, 6, and 7, and $b^{15}$ designates a bolt projected through each of the brackets and extending inwardly and horizontally therefrom at each end and side of the machine. The fingers $f'$ of the plates $m'$ are rounded out on their upper sides, as shown in Fig. 3, and are arranged to rest against and engage the bolts $b^{15}$ with the rounded-out portions to hold the plates $m'$ in horizontal position when not in use. The springs on the rods D by engagement with the fingers $f^2$ act to keep the plates $m^2$ in a horizontal position.

The letters $g^2$ designate gas-pipes, from which gas issuing in jets is burned to heat the fold-creasing parts $m'$ $m^2$, and the letter $s^8$ indicates a shield-plate arranged to prevent the flame of the gas from igniting the fabric or burning the shirt.

The letters A A designate the folder parts constructed and arranged to put in the angular sleeve-fold creases of the shirt, there being one of these angular-sleeve-fold-creasing mechanisms at each side of the machine. Each of these angular-fold-creasing devices is preferably made of two parts or plates, laid one above the other, and they are each pivoted onto a rod or bar $R^{14}$ and are each provided with fingers and springs engaging with, so as to bear on, the latter. The upper part of each of these angularly-placed fold-line creasers is designated at $n'$, and it is pivoted to the rod $R^{14}$ at $h^5$ and provided with fingers $f^6$ and springs $S^9$, having tangent arms $a^9$. The lower part is designated at $n^2$. It is pivoted to the rod or bar $R^{14}$ at $h^5$, and is provided with fingers $f^7$ and springs $S^{10}$, having tangent arms $a^{10}$, the latter springs being at one end connected to the rod $R^{14}$, and from where thus connected made to helically encircle said rod or bar, with their tangent arms bearing on the upper side of the fingers $f^7$. The springs $S^9$ are also connected to the rod or bar $R^{14}$ in the same manner, but arranged with their tangent arms $a^9$ to bear on the under side of the fingers $f^6$ of the plate $n'$, so that these plates $n'$ and $n^2$ can open apart on their inner contact edges to admit the edge of the angularly-placed stationary table-plate $T^2$ (which will be subsequently described) against the force of springs $S^9$ and $S^{10}$.

The angular-fold-creasing devices are held in horizontal position by means similar to those specified as holding the side-creasers in horizontal position. Each of these fold-creasing devices A A is arranged on an angle that is obtuse to the machine-table at the rear and acute where the table is in advance of them, and each of these angular-fold-creasing devices is provided with two downwardly-extended legs $L^6$, which at their lower ends $e^7$ are journaled onto the rod or bar $R^4$, so that they can oscillate thereon.

The letters $R^6$ designate a rod or bar connecting with each of the legs $L^6$ of each of the angular-fold-creasing devices, and $P^4$ a pitman which at its outer end $e^8$ is journaled onto the rod $R^6$ of each of them. The inner end of each of these pitmen connects with an eccentric $E^2$, arranged on the shaft S, the said eccentrics being arranged thereon oppositely as to their throw or eccentricity, so that when the shaft S is making one revolution the angular-fold-creasing devices A A are drawn toward each other and so as to engage with the angularly-placed table-plate $T^2$, as will be more fully detailed hereinafter in connection with a description of the latter.

The letter $g^4$ designates a pipe, from which gas is burned by means of apertures therein to heat the plates $n'$ and $n^2$, and $d^{11}$ a shield-plate arranged to prevent the gas from burning the shirt, as shown at Figs. 2, 4, and 8.

The table-plate T is arranged between the bosom-side-fold-creasing mechanisms $F^2$ and supported at its ends and center on the frame F. It has straight side edges $e^9$ and is placed relatively to the bosom-side-fold-creasing mechanisms $F^2$, so that when the latter are moved toward each other they on their inner edges will engage with the side edges of the table-plate, and when said bosom-side-fold-creasing devices $F^2$ are made in two parts or plates that are pivoted together it will enter between and force them apart on their pivoted connection against the force of the springs of the under plate and the weight of the upper plate.

The angularly-placed table-plate $T^2$ has blade side edges $e^{11}$, and is secured to the under side of the table-plate T so as to correspond to and be parallel with the downward and angular projection of the angular-sleeve-fold-creasing devices A when the latter come in contact with the former. This angularly-placed table-plate is arranged between the angular-crease-fold devices A, and when the latter are made with the two plates $n'$ and $n^2$, hinged to the rod $R^{14}$, the blade-edge $e^{11}$ of the table-plate will enter between the said plates and force them apart against the action of their springs when the said fold-creasing devices A are moved to engage with the angular table-plate.

The letter $B^4$ designates the bosom-holder plate, which is made with a straight side edge that aligns with the side edge of the table T and is operated by hand to descend onto the bosom of the shirt when placed on the table T with the bosom uppermost and the sleeves hanging down, as shown at Fig. 1, and to be raised up for the removal of the shirt after the fold-creases have been made therein and into the position shown at Figs. 2 and 8. The bosom-holder plate proper is designated at B⁴, and its function is, when pressed down on the bosom and shirt, to keep the same in place, and it is preferably constructed and operated as follows to perform this function.

The letter I designates an arm that is connected with the top of the bosom-holder plate and therefrom extended rearwardly to run in a vertical guideway G, made in the plate $y$.

The letter M designates another guideway attached to the frame F, and N a guide-rod attached to the arm I and downwardly projected through said guideway M.

The letters O' O² designate two links, the upper one of which is pivoted to the lower end of the guide-rod N, and the lower link O² is pivoted at O⁴ to a bar O⁵, projected inwardly from the machine-frame, with both of said links at their adjacent ends pivoted to the rod O⁷, which is extended frontwardly through the machine-frame and provided with a pivoted hand-lever L⁸, so that when the latter is pulled out the bosom-holder plate is caused to descend onto the shirt placed on the table-plate, and when the action of said lever is reversed the bosom-holder plate is raised from off the shirt and table-plate, as shown at Figs. 3 and 8.

The rear end of the bosom-holder plate is notched out at $k^2$ to receive the upwardly-projected neckband of the shirt, and this bosom-holder plate is provided with an aperture A⁴, made in the latter, or recesses $j^4$, made in the side edge thereof for sight-openings and for the proper alignment of the bosom edge with the side edges of the table-plate.

When the bosom-side-fold-creasing devices and also the angular-sleeve-fold-creasing devices engage with the intermediate shirt parts and the respective table-plates, it is desirable that they should remain in such engagement for a short time to more thoroughly impress into the intermediately-placed fabric the desired fold-creases. To accomplish this momentary detention while in this position, the bearings $e^4$ of the pitmen P² of each of the crease-folders F² are made slightly elliptical, as shown by the dotted line $d^{11}$ of Fig. 7, and to insure the same effect upon the angular-crease folders A the pitmen P⁴ of each of their journal ends $e^7$ have their bearings made slightly elliptical, as shown by the dotted line $d^{13}$ of Fig. 7.

The letters D⁵ designate springs connecting the legs of the crease-folders F² to keep them from shaking or vibrating in their elliptical connections with the pitmen.

As thus made and arranged, a laundered shirt is placed on the table-plate with the bosom-holder plate operated to descend thereon and hold the same in place. When the push-button is forced in, the side-folders F² and the angular folders A are forced inwardly, the former toward the table-plate to press into the shirt the bosom side-folds F⁷ by the pressure upon the shirt of the crease-folders F², where between the latter and the edges of the table-plate T, while the pendent shirt-sleeves are caught between the inwardly-moving angular creasing devices A and the stationary angular table-plates T² to press into the sleeves the angular folds F⁸.

While I have illustrated and described the bosom-side-fold-creasing devices F² as made in two parts that are pivoted together, if desired, they may be made of a single piece of metal, as shown at Fig. 17, and having a side slot $v$ on their inner edges, into which slot, as said fold-creaser F² approaches the edges of the side table-plate T, the latter will enter and press into said slot the intermediate shirt, and the angular folders A, instead of each being made into two parts and pivoted together, may each be made in one piece, with a slot $v$ on its inside edge, as shown at Fig. 17, and as thus constructed each of them may be operated to receive the edge of the angular table-plate T² and an intermediate shirt-sleeve part, as shown in cross-section.

The function of the bosom folder-plate being to descend onto and from off of the top surface of the table-plate, and while down upon the latter to hold the intermediately-placed shirt firmly at the side edges of the table, it differs from holder-plates used in connection with ironing-machines where the holder-plate subtends at the sides of the table-plate and passes below the side edges of the latter to clamp the bosom upon the board or table-plate.

I do not limit my invention thereof to the particular means shown to operate the same, for any other means that will operate it to move in substantially the same manner may be used.

The function of the fold-creasers F² and the angular fold-creasers A being to engage with their respective table-plates and crease into the shirt-body the bosom side-folds and into the sleeves the angular folds, any mechanism other than that shown which will operate them in substantially the same manner may be used.

Having thus described my invention, what I claim, and desire to secure by Letters Patent, is—

1. The combination of the table T, the bosom-holder plate B⁴, formed with the rearward-extending arm I, having a downwardly-projected guide-rod N, arranged in a guideway in the frame of the machine, the plate $y$, formed with a guideway to receive and hold the end of the arm I, and a lever to raise and lower the bosom-holder plate, substantially as described.

2. The combination, with the table-plate T, having straight side edges, of the fold-line creaser F², arranged at each side of said table-plate, and with each of said creasers operated to engage with the adjacent side edge of said table-plate and an intermediately-placed shirt and to then move away from such engagement, substantially in the manner as and for the purposes set forth.

3. The combination, with the table-plate T, having straight side edges, of the bosom-holder plate B⁴, operated to descend onto and from off of said table plate, and the fold-line creaser F², arranged at each side of said table-plate, with each of said fold-line creasers operated to engage with the adjacent side edge of said table-plate and an intermediately-placed shirt and to then move away therefrom, substantially in the manner as and for the purposes set forth.

4. The combination, with a table-plate adapted to have a shirt placed thereon with the sleeves pendent therefrom, substantially as described, of a sleeve-line-fold plate downwardly and frontwardly projected from beneath said table-plate on an angle thereto and a fold-line-creasing device arranged on each side of said sleeve-fold-line plate, each made in angular coincidence with said sleeve-fold-line plate, and with each of said creasing devices operated to make an engagement with the adjacent edge thereof, and an intermediately-pendent shirt-sleeve to crease a fold-line therein and then to move away therefrom, substantially in the manner as shown and described.

5. The combination, with the table-plate T, having a bosom-holder plate constructed to operate in connection therewith, substantially as described, of the fold-line creaser F², arranged at each side of said table-plate and operated to each engage with the adjacent side edge of said table-plate and an intermediately-placed shirt thereat and to move away therefrom, substantially as described, the angularly and downwardly projected sleeve-fold plate T², arranged beneath said table-plate, and the fold-line creaser A, arranged at each side of said sleeve-fold plate, and each operated to engage with the adjacent edge of said sleeve-fold plate and an intermediately-pendent shirt-sleeve thereat, and then to move away therefrom, substantially in the manner as and for the purposes set forth.

6. The combination, with the table T, of the fold-line creasers F², arranged at each side thereof, each of said fold-line creasers being made of the metal plate parts $m'$ and $m^2$, arranged one above the other and in contact, and each of them separately pivoted to the rod D on their outer edges, and each of them thereat constructed with projecting fingers, those on the lower plate part $m^2$ being adapted to engage with springs on said hinging-rod, against the force of which springs and the weight of the upper plate part $m'$ they are moved apart on their pivoted connection, and with each of said fold-line creasers F² operated to engage with the adjacent side edge of the said table-plate, so that they will open apart on their inner edges to each receive one of the side edges of the said table-plate and an intermediate shirt part and then to draw away therefrom, substantially in the manner as and for the purposes set forth.

7. The combination, with the table-plate T, adapted to have a shirt placed thereon with its sleeves pendent therefrom, of the sleeve-fold-line plate T², downwardly projected from beneath said table-plate on an angle, the sleeve-fold creaser A, arranged at each side of said angular sleeve-fold-line plate, each of said sleeve-fold-line creasers being made of the plate parts $n'$ and $n^2$, arranged one above the other in contact, and each of said parts pivoted to the rod R¹⁴ on their outer edge and each thereat provided with fingers adapted to engage with springs on said rod, against the force of which springs said plates open apart on their hinged connection, and each of said sleeve-fold creasers operated to engage with the adjacent side edge of said plate T² to open to receive the latter and an intermediate and pendent shirt-sleeve and then to draw away therefrom, substantially in the manner as and for the purposes set forth.

8. The combination, with the table-plate T, of the fold-line creasers F², arranged at each side thereof, and each of which fold-line creasers have legs which are at their lower ends journaled to a support, the driving-shaft S, operated to start and to make one revolution and to automatically stop, substantially as described, an eccentric for each of said fold-line creasers upon said driving-shaft, each arranged oppositely as to throw, and a pitman connecting at its inner end with each of said eccentrics and at its outer end having an elliptical bearing where making a journaled connection to operate each of said fold-line creasers, substantially in the manner as and for the purposes set forth.

9. The combination, with the table-plate T, of the fold-line creasers F², arranged at each side thereof, which fold-line creasers have legs which at their lower ends are journaled to a support, the driving-shaft S, operated to start and to make one revolution and to then automatically stop, substantially as described, an eccentric for each of said fold-line creasers upon said driving-shaft, each of which is arranged oppositely thereon as to throw, a pitman connecting at its inner ends with each one of said eccentrics and at its outer end having an elliptical bearing where making a journaled connection to operate each one of said fold-line creasers, and a spring connecting the legs of said fold-line creasers, substantially in the manner as and for the purposes set forth.

10. The combination, with the table-plate T, adapted to have a shirt placed thereon with its sleeves pendent therefrom at each side thereof, of a sleeve-fold-line plate T², downwardly and frontwardly projected from beneath the said table-plate on an angle, the sleeve-fold-line creaser A, arranged on each side of said sleeve-fold-line plate, each of said creasers having downwardly-projected legs that are journaled at their lower ends to a support, the driving-shaft S, operated to make one revolution when started and to automatically stop, an eccentric for each of said fold-creasers A, arranged on said shaft, each of which is placed oppositely thereon as to throw, and a pitman connecting at its inner ends with each of said eccentrics and at its outer end having an elliptical bearing where connecting to operate said creasers, substantially in the manner as and for the purposes set forth.

11. The combination, with the fold-line creasers $F^2$, of the gas-pipe $g^2$, provided with flame-apertures, and the shield-plate $S^8$, arranged with reference to said fold-line creasers substantially as and for the purposes set forth.

12. The combination, with the sleeve-fold-line creasers A, of the gas-pipe $g^4$, made with flame-apertures, and the shield-plate $d^{11}$, arranged with reference to said fold-line creasers, substantially as and for the purposes set forth.

13. In a machine for putting the bosom side-fold lines and the angular sleeve-fold lines into shirts, the combination of a table-plate on which a shirt may be placed with each of its sleeves pendent from the opposite sides thereof, a holder-plate operated to descend onto and ascend from off said table-plate, a sleeve-fold-line plate downwardly and frontwardly projected from beneath said table-plate on an angle, a fold-line creaser at each side of said table-plate, constructed and arranged to engage with the adjacent side edge thereof, a fold-line creaser at each side of said sleeve-fold-line plate constructed and arranged to engage with the adjacent side edge thereof, and a driving-shaft constructed and operated when started to make one revolution and automatically stop, said shaft making connection with each of said creasers to operate them synchronously to produce one reciprocation at each rotation of said shaft, substantially in the manner as and for the purposes set forth.

Signed at Troy, New York, this 25th day of November, 1889, and in the presence of the two witnesses whose names are hereto written.

JOSEPH McKAY.

Witnesses:
 N. E. HAGAN,
 CHARLES S. BRINTNALL.